United States Patent [19]

Werwa

[11] 4,325,179
[45] Apr. 20, 1982

[54] PROCESS FOR FABRICATING A SELF-CONTAINED INK APPLICATOR FOR CONTINUOUS IMPRINTING ON NON-ABSORBENT SURFACES

[76] Inventor: Harold Werwa, 4120 NW. 88th Ave., Apt. 102, Coral Springs, Fla. 33065

[21] Appl. No.: 173,852

[22] Filed: Jul. 30, 1980

[51] Int. Cl.³ .................... B23P 25/00; B41F 31/00; B41K 1/40
[52] U.S. Cl. .................... 29/458; 101/327; 401/199; 401/292
[58] Field of Search .............. 29/458, 527.2; 101/327; 401/292, 199, 205

[56] References Cited

U.S. PATENT DOCUMENTS

| | | | |
|---|---|---|---|
| 2,318,465 | 5/1943 | Chollar | 101/327 X |
| 2,490,902 | 12/1949 | Goodwin | 101/327 |
| 2,598,806 | 6/1952 | Lauer | 101/327 X |
| 3,113,336 | 12/1963 | Langnickel | 401/199 X |
| 3,336,244 | 8/1967 | Rockoff | 101/327 UX |
| 3,342,911 | 9/1967 | Funahashi | 101/327 X |
| 3,402,663 | 9/1968 | Funahashi | 101/327 |
| 3,778,495 | 12/1973 | Woolley | 401/292 X |
| 3,832,947 | 9/1974 | Funahashi | 101/327 |
| 3,896,602 | 7/1975 | Petterson | 29/458 X |
| 3,988,987 | 11/1976 | Dkura et al. | 101/327 |
| 4,195,570 | 4/1980 | Haren | 101/327 X |

*Primary Examiner*—Charlie T. Moon
*Attorney, Agent, or Firm*—Allen R. Morganstern

[57] ABSTRACT

This invention relates to an improved design associated with the fabrication and construction of a self-contained ink applicator capable of enabling the continuous printing upon non-absorbent surfaces, said self-contained ink applicator comprising an exterior housing having a reservoir containing a porous material which is in direct contact with a porous rigid supporting member which in turn is in direct contact with a porous rubber die which conveys the desired imprinting sought upon non-absorbent surfaces, therebeing initially impregnated into said porous rubber die a solvent capable of enlarging the cell structure thereof in a controlled fashion so as to permit the utilization of inks capable of imprinting on non-absorbent surfaces, the above being achieved after initially impregnating said porous rubber die with said solvent to then immediately thereafter impregnate said porous rubber die with an ink composition that has contained therein said solvent thereby maintaining the expanded cell structure as referred to above, the reservoir additionally containing said ink composition that has contained therein said solvent.

5 Claims, 3 Drawing Figures

PROCESS FOR FABRICATING A SELF-CONTAINED INK APPLICATOR FOR CONTINUOUS IMPRINTING ON NON-ABSORBENT SURFACES

BACKGROUND AND OBJECTS OF THE INVENTION

The present invention relates generally to a new and improved design associated with the fabrication and construction of a self-contained ink applicator capable of enabling the continuous printing on non-absorbent surfaces. Although prior art devices have been developed which do permit imprinting upon a non-absorbent surface, their application for commercial use is extremely limited in that they are unable to provide a self-contained, continuous capability of printing upon non-absorbent surfaces.

It is in the context of the above, that one of the primary objectives of the present invention is to create a new and improved self-contained ink applicator which is self-contained and capable of enabling the continuous printing on non-absorbent surfaces at a rate and speed required for commercial applications and thus eliminate the present method of printing on non-absorbent surfaces which provides for an operator to take a rubber die, ink it by placing it in physical contact with a stamp pad which contains the appropriate inking composition desired and to then stamp the non-absorbent surface with said inked rubber die, said method being time consuming, inefficient, costly, and wasteful of ink as the ink's rate of evaporation is relatively high.

It is another object of this invention to create a new and improved design for a self-contained ink applicator capable of continuous printing on non-absorbent surfaces which contains therein a sufficient reservoir of ink so as to make said self-contained ink applicator commercially feasible.

It is another object of this invention to create a new and improved self-contained ink applicator that has a constantly flowing supply of ink through the reservoir thereof, as well as through its porous rubber die said reservoir and porous rubber die being free of impediments to said flow and said flow being at such a rate as to make the continuous utilization thereof feasible.

It is another object of this invention to create a new and improved self-contained ink applicator that is rugged in construction, capable of mass production and reliable.

The objects and advantages of the invention are set forth in part herein and in part will be obvious herefrom or may be learned by practice of the invention the same being realized and attained by the means of the instrumentalities and combinations pointed out in the appended claims.

The invention consists in the novel parts, constructions, arrangements, combinations and improvements herein shown and described.

SUMMARY OF THE INVENTION

Figure 1:
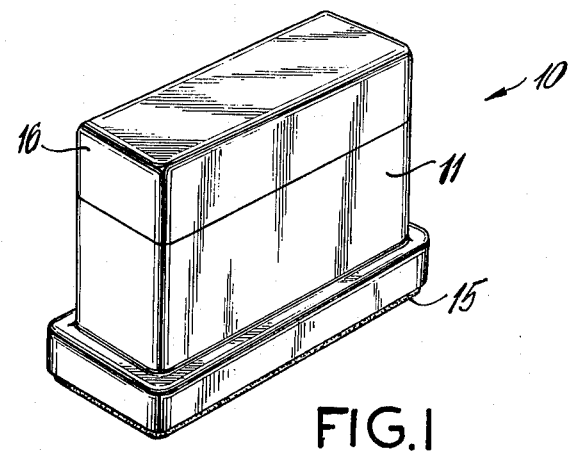
FIG. 1, is a three dimentional prospective view of a self-contained ink applicator constructed in accordance with the invention.

Briefly described the present invention relates to a new and improved design associated with the fabrication and construction of a self-contained ink applicator capable of enabling the continuous printing upon non-absorbent surfaces, said self-contained ink applicator comprising an exterior housing having a reservoir containing a porous material which is in direct contact with a porous rigid supporting member which in turn is in direct contact with a porous rubber die which conveys the desired imprinting sought upon non-absorbent surfaces, therebeing initially impregnated into said porous rubber die a solvent capable of enlarging the cell structure thereof in a controlled fashion so as to permit the utilization of inks capable of imprinting on non-absorbent surfaces.

As is well known in the prior art, there basically exists two means by which printing is imprinted upon a surface by an ink applicator, one process being wherein the desired printing is achieved by having the ink printed upon a particular surface absorb said ink, said ink utilized under these conditions comprising a dye with a slow evaporating solvent, therebeing no utilization of resins. Although the absorption concept has tremendous applicability, said process cannot be utilized in a commercial fashion upon a non-absorbent surface such as metals, plastics, cellophane and the like.

To achieve imprinting upon a non-absorbent surface which is an object of this invention, an air drying ink must be utilized, said ink consisting of a dye, a solvent that acts as a carrier media and resin which provides the capability of adhering the dye-solvent combination to the non-absorbent surface.

It is this latter application related to the printing upon non-absorbent surfaces and the utilization of air drying inks that the present invention directs and addresses itself.

In keeping with the invention, there is provided an exterior housing shaped so as to provided an interior chamber which acts as a reservoir for said air drying ink, said reservoir being filled with a porous material which is in direct contact with a porous rigid supporting member that provides structural support for the porous rubber die which in fact conveys the desired printing being sought upon said non-absorbent surface. Initially, said porous rubber die utilized in accordance with the invention is initially impregnated with a solvent capable of enlarging the cell structure thereof to a desired and controlled level so as to permit a constant flow of air drying ink from said reservoir through said porous rigid supporting member and said porous rubber die and eventually onto the non-absorbent surface that is to be printed thereon, said porous material having its enlarged cell structure maintained in such a state by utilizing in the composition of said air drying ink, as the carrier media for the dye and resin contained therein, the solvent initially utilized with regard to the initial enlargement of said cell structure of said porous material.

In keeping with the invention, and in accordance with a preferred embodiment thereof, the solvent utilized to increase the cell structure of said porous rubber die is Ethylene Glycol Mono Methyl Ether more commonly known as Methyl Cellosolve. Additionally, and as alternative solvents, it is within the scope of this invention to utilize in place of Ethylene Glycol Methyl Mono Ether more commonly known as Methyl Cellosolve any one of the following, to wit, Diethylene Glycol Mono Methyl Ether more commonly known as Methyl Carbitol; Ethylene Glycol Mono Ethyl Ether Acetate more commonly known as Cellosolve Acetate; or Dimethyl Formamide more commonly known as DMF. With regard to the composition of the porous rigid supporting member same is porous polyethylene whose properties of being resistant to solvent action, of not being susceptible to compression or expansion and of not allowing the resins in an air drying ink to clog its open cell structure makes such material highly desirable for said application.

As previously stated, the present invention provides a structure as well as design wherein there is created a self-contained portable ink applicator that provides a continuous flow of air drying ink for application upon non-absorbent surfaces in such a fashion and manner as to create a feasible commercially usable item.

The accompanying drawings referred to herein and constituting a part hereof are illustrative of the invention but not restrictive thereof, and, together with the descriptions, serve to explain the principles of the invention.

DESCRIPTION OF A PREFERRED EMBODIMENT

Figure 2:
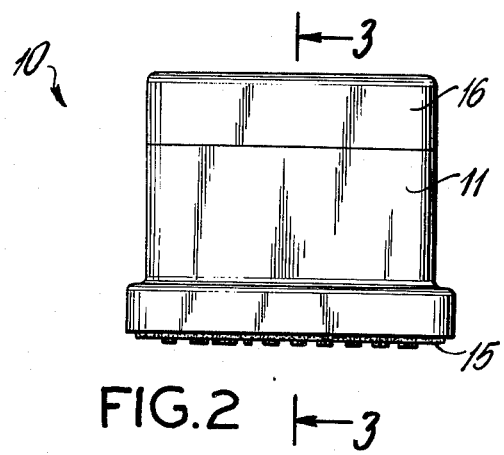
FIG. 2, is a front elevational view of the self-contained ink applicator constructed in accordance with the invention as illustrated in FIG. 1.
Figure 3:
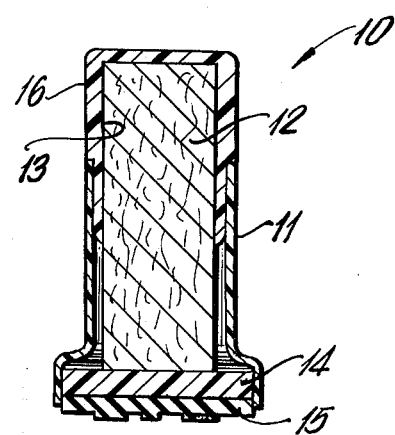
FIG. 3, is a cross-sectional view of the self-contained ink applicator as depicted in FIG. 2 taken along line 3—3 of FIG. 2.

Reference is now herein made to FIG. 1 wherein there is depicted a three dimensional respective view of a self-contained ink applicator constructed in accordance with this invention, said self-contained ink applicator being designated generally by reference numeral 10. FIG. 2 is a front elevational view of the self-contained ink applicator illustrated in FIG. 1 and FIG. 3 is a cross-sectional view of the self-contained ink applicator as depicted in FIG. 2, taken along line 3—3 thereof.

As depicted in the drawings, self-contained ink applicator 10 comprises an exterior housing 11 formed so as to provide an interior chamber 13, which acts as a reservoir for air drying ink and which is capable of containing porous material 12 as well as capable of containing porous rigid supporting member 14 and porous rubber die 15. As depicted in the drawings, self-contained ink applicator 10 additionally has a removable cap 16 which permits access to interior chamber 13 so as to permit the application of an ink composition onto porous material 12 located within interior chamber 13, thereby providing a reusable self-contained ink applicator 10 whose functional life is not limited to the initial quantity of ink composition initially placed within the structure of self-contained ink applicator 10.

As hereinbefore set forth, the present invention is directed to a self-contained ink applicator 10 capable of enabling continuous printing upon non-absorbent surfaces, wherein an air drying ink is utilized, said ink consisting of a dye, a solvent that acts as the carrier media and a resin that provides the capability of adhering the dye-solvent combination to the non-absorbent surface. Additionally, as hereinbefore set forth and in keeping with the invention, self-contained ink applicator 10 achieves the objects of this invention by initially having porous rubber die 15 impregnated with a solvent capable of enlarging the cell structure thereof to a desired and controlled state so as to permit a constant flow of air drying ink in sufficient quantities through said porous rubber die 15 since the characteristics of the cell structure of untreated porous rubber die 15 are of a nature and size so as not to be able to allow for the flow of air drying ink through the cell structure of untreated porous rubber die 15 in sufficient quantity and rate so as to keep pace with the amount of air drying ink required to flow out of said porous rubber die 15 during commercial applications of said self-contained ink applicator 10.

In keeping with the invention, porous rubber die 15 is initially immersed in a solvent solution found to be capable of enlarging the cell structure of said porous rubber die 15, the solvent herein preferably used being Ethylene Glycol Mono Methyl Ether, more commonly known as Methyl Cellosolve, although it is additionally within the scope of this invention to utilize in place of Ethylene Glycol Mono Methyl Ether, more commonly known as Methyl Cellosolve, any one of the following; to wit, Diethylene Glycol Mono Methyl Ether, more commonly known as Methyl Carbitol; Ethylene Glycol Mono Ethyl Ether Acetate, more commonly known as Cellosolve Acetate; or Dimethyl Formamide more commonly known as DMF.

Once having immersed porous rubber die 15 into said solvent solution as herein preferably embodied, to wit, Ethylene Glycol Mono Methyl Ether, more commonly known as Methyl Cellosolve, it is imperative that the time between withdrawal of said porous rubber die 15 from said solvent solution and assembly into said self-contained ink applicator 10 and into contact with the air drying ink utilized herein, which consists of a dye, a resin and the identical solvent utilized to enlarge the cell structure of porous rubber die 15, which in the preferred embodiment of this invention is Ethylene Glycol Mono Methyl Ether, more commonly known as Methyl Cellosolve, be as short as possible so as to prevent the evaporation of the solvent Ethyle Glycol Mono Methyl Ether, more commonly known as Methyl Cellosolve, from porous rubber die 15, and thus preventing the cell structure of porous rubber die 15 from returning to its original state. By keeping porous rubber die 15 continuously immersed in said solvent either by having said porous rubber die 15 immersed directly in said solvent, or by having said porous rubber die 15 continuously bathed in an air drying ink that has as its solvent component said solvent utilized initially to enlarge the cell structure of said porous rubber die 15, there are achieved the advantages of the invention.

It should be further noted that although in the preferred embodiment discussed above, the solvent utilized to initially enlarge the cell structure of porous rubber die 15 and the solvent component of the air drying ink utilized within said self-contained ink applicator 10 were the same, to wit, Ethylene Glycol Mono Methyl Ether, more commonly known as Methyl Cellosolve, nothing herein should be construed so as to so limit the invention thereto, but rather any of the solvents herein mentioned could be utilized either in the immersing step or as the solvent component in said air drying ink, it not being necessary for the identical solvent to be used in both immersing step and as the solvent in the air drying ink, but rather any combination or pemutation of the above referenced solvents is within the scope of this invention as are any other solvents capable of achieving the above referenced results.

The preceding description and accompanying drawings relate primarily to a specific embodiment of the invention, and the invention in its broader aspect should not be so limited to one specific embodiment as herein shown and described, but the departures may be made therefrom within the scope of the accompanying claims without departing from the principles of the invention and without sacrificing its chief advantages.

I claim:

1. A process for fabricating a self-contained ink applicator for continuous imprinting on non-absorbent surfaces, said process comprising the steps of;
   (a) fabricating a housing formed so as to provide an interior chamber;
   (b) immersing a porous material into an air drying ink composition for utilization on non-absorbent surfaces, said air drying ink composition comprising a dye, a resin and a solvent, said solvent being capable of enlarging the cell structure of a porous rubber die utilized in said self-contained ink applicator;
   (c) placing within said interior chamber after immersing said porous material;
   (d) mounting within said housing a porous rigid supporting member which is immediately adjacent to said interior chamber and in direct contact with said porous material;
   (e) immersing said porous rubber die into an air drying ink composition for utilization on non-absorbent surfaces, said air drying ink composition comprising a dye, a resin and a solvent, each being identical to that utilized regarding the immersion of said porous material; and
   (f) mounting onto said housing said porous rubber die immediately after the immersion of said porous rubber die into said air drying ink composition, said porous rubber die being mounted onto said housing immediately adjacent to and in direct contact with said porous rigid supporting member, said porous rubber die having exposed on its exterior surface after mounting onto said housing a formed predetermined imprint.

2. A process for fabricating a self-contained applicator for continuous imprinting on non-absorbent surfaces as described in claim 1 wherein said solvent utilized with regard to said air drying ink composition is Ethylene Glycol Mono Methyl Ether.

3. A process for fabricating a self-contained applicator for continuous imprinting on non-absorbent surfaces as described in claim 1 wherein said solvent utilized with regard to said air drying ink composition is Diethylene Glycol Mono Methyl Ether.

4. A process for fabricating a self-contained applicator for continuous imprinting on non-absorbent surfaces as described in claim 1 wherein said solvent utilized with regard to said air drying ink composition is Ethylene Glycol Mono Ethyl Ether Acetate.

5. A process for fabricating a self-contained applicator for continuous imprinting on non-absorbent surfaces as described in claim 1 wherein said solvent utilized with regard to said air drying ink composition is Dimethyl Formamide.

* * * * *